United States Patent [19]
Leonhardt et al.

[11] Patent Number: 5,253,246
[45] Date of Patent: Oct. 12, 1993

[54] UNIVERSAL DATA STORAGE ELEMENT FOR PROVIDING VARIOUS DATA STORAGE MEDIA IN A STANDARD EXTERIOR HOUSING

[75] Inventors: Michael L. Leonhardt, Longmont; Charles A. Milligan, Golden, both of Colo.

[73] Assignee: Storage Technology Corporation, Louisville, Colo.

[21] Appl. No.: 834,665

[22] Filed: Feb. 12, 1992

Related U.S. Application Data

[63] Continuation of Ser. No. 620,275, Nov. 30, 1990.

[51] Int. Cl.[5] .................. G11B 23/02; G11B 17/22; G11B 15/68
[52] U.S. Cl. .................. 369/291; 369/36; 360/92; 360/132
[58] Field of Search .................. 360/132, 92; 369/291, 369/34, 36, 38, 39

[56] References Cited

U.S. PATENT DOCUMENTS

| | | | |
|---|---|---|---|
| 4,694,360 | 9/1987 | Ohyama et al. | 360/132 |
| 4,701,900 | 10/1987 | Hasegawa et al. | 369/36 |
| 4,805,060 | 2/1989 | Ohtani et al. | 360/132 |
| 4,837,758 | 6/1989 | Motoyama et al. | 360/132 |
| 4,899,326 | 2/1990 | Takeya et al. | 369/36 |
| 4,994,929 | 2/1991 | Chen | 360/132 |
| 5,055,947 | 10/1991 | Satoh | 360/132 |

*Primary Examiner*—Eugene R. LaRoche
*Assistant Examiner*—Michael C. Kessell
*Attorney, Agent, or Firm*—Duft, Graziano & Forest

[57] ABSTRACT

The universal data storage element presents a uniform form factor data storage element but enables the user to vary the contents to include a selection of media types or miniaturized drive elements used therein to provide variable data storage and/or recording characteristics. This enables the user to use multiple types of media in an automated library system or a manually operated media storage and retrieval system, since the form factor of all of the data storage elements contained therein is uniform. The use of the universal data storage element provides the capability of varying the data storage capabilities of the data storage element to be consistent with the data recording technique used therein. This capability enables the user to use a diversity of drive elements connected to the computer system without having to have a corresponding diversity in media element handling systems.

13 Claims, 6 Drawing Sheets

UNIVERSAL DATA STORAGE ELEMENT FOR PROVIDING VARIOUS DATA STORAGE MEDIA IN A STANDARD EXTERIOR HOUSING

This is a continuation of application Ser. No. 07.620,275, filed Nov. 30, 1990.

CROSS REFERENCE TO RELATED APPLICATIONS

This application is related to a patent application titled VIRTUAL ROBOT FOR A MULTIMEDIA AUTOMATED CARTRIDGE LIBRARY SYSTEM, Ser. No. 07/616,667, filed Nov. 21, 1990.

FIELD OF THE INVENTION

This invention relates to data storage systems and, in particular, to a data storage element that presents a data storage element form factor having substantially uniform exterior dimensions and containing media of variable type and configuration.

PROBLEM

It is problem in data processing systems to provide data storage capacity that is adaptable to the varying needs of the computer system. Existing data storage subsystems are inflexible, based on a single type of media, having predetermined mechanical, electrical, and operational constraints. A computer system user must therefore purchase a mixture of data storage subsystems to match the data storage capabilities with the nature of the data stored thereon. The selection of a data storage subsystem also forces the user to restrict the media to a type that matches the installed data storage subsystem. Often, the cost of additional incompatible data storage subsystems is prohibitive. The transition from one media to another is generally controlled by the need to change one of the primary storage subsystem characteristics such as volumetric efficiency of data stored per unit of space occupied, access performance (e.g. load, search, transfer times, etc.), cost, reliability, archival data storage capabilities (e.g. shelf life, environmental hardness, format standards, etc.), or management (e.g. media interchange, automated handling, catalogue systems, physical facilities, etc.). For removable media types, the effects of such transitions are exacerbated by the use of large automated library systems. An example of these automated library systems is the 4400 Automated Cartridge System manufactured by Storage Technology Corporation, which provides economical and efficient handling of thousands of the industry standard 3480-type magnetic tape cartridge for an associated plurality of tape cartridge drive systems but the requires the user to commit to a significant investment in 3480-type tape cartridges and tape drives. The robotic media handling elements in an automated library system typically can not handle diverse types of media, since such robots are typically designed to handle a specific media having a specific form factor. Furthermore if it were possible to introduce different media of similar form factor, management would require a way to identify and differentiate individual media units. Thus, while the automated library system provides tremendous data storage and data retrieval performance improvement, it has the disadvantage of constraining the user to a specific media having a specific form factor.

SOLUTION

The above described problems are solved and a technical advance achieved in the field by the universal data storage element of the present invention. Existing removable media data storage and retrieval systems, whether manual or robotic, are predicated on the use of removable data storage elements of predefined, uniform external dimensions, internal structure, media and recording characteristics. The universal data storage element of the present invention presents a uniform form factor data storage element but enables the user to vary the contents to include a selection of media types with or without electronic controls or further to include miniaturized drive elements. These would be used therein to provide variable data storage and/or recording characteristics. This invention also presents encoding means for identifying the content of the universal data storage element. This enables the user to use multiple types of media in an automated library system or a manually operated media storage and retrieval system, since the form factor of all of the data storage elements contained therein is uniform. The use of the universal data storage element varies the data storage capability of the data storage element to be consistent with the data recording technique used by devices associated with either system. This capability enables the user to connect a diversity of drive elements to the computer system without having to have a corresponding diversity in media element handling systems. This is accomplished by the use of a standardized data storage element having a form factor of substantially uniform exterior dimensions and adapted to receive any one of a plurality of different media types.

In the preferred embodiment disclosed herein, the industry standard 3480-type magnetic tape cartridge form factor is used to illustrate the invention. The 3480-type magnetic tape cartridge consists of a substantially rectangular exterior housing which contains a single reel of magnetic tape, which tape has a leader block affixed to one end. The leader block is exposed through an opening in the exterior housing of the magnetic tape cartridge, for use by an associated tape drive to retrieve the tape from the magnetic tape cartridge.

Using this exterior housing, the universal data storage element includes an opening at one end of the housing through which the associated drive element can access the media contained within the data storage element. The media itself is located within the data storage element and is either permanently mounted therein or is mounted on a carriage member which renders the media or a connector that enables one to record on the media to be extracted from the exterior housing. The specifics of such a carriage mechanism vary with differing types of media contained thereon.

An associated interface element is incorporated between the drive element and the automated library system or manual media storage and retrieval system in order to physically interface the universal data storage element with the media standard drive element. Thus, the interface element receives the universal data storage element from the automated library system, or from a user, decodes the media type and if compatible accesses the media stored in the data storage element. This access can be in the form of inserting a recording element into the universal data storage element, extracting a connector attached to the data storage media contained within the universal data storage element, or extracting the media from the housing using the carriage of the data storage element. When extracting either the media or the connector to the media from the housing, the interface element physically loads the retrieved media or connector into the associated drive element which enables the reading and writing of data on the media. Thus, the use of a fixed form factor universal data storage element enables the user to equip a library system with a plurality of diverse drive elements, each requiring a different type of media. The variability of the media within the universal data storage element and the associated interface elements enables the physical handling of every data storage element in a uniform manner.

DETAILED DESCRIPTION

Existing removable media data storage and retrieval systems, whether manual or robotic, are predicated on the use of removable data storage elements of predefined, uniform external dimensions internal structure, media and recording characteristics. The universal data storage element of the present invention presents a uniform form factor data storage element but enables the user to vary the contents to include a selection of media types or miniaturized drive elements used therein to provide variable data storage and/or recording characteristics. This enables the user to use multiple types of media in an automated library system or a manually operated media storage and retrieval system, since the form factor of all of the data storage elements contained therein is uniform. The use of the universal data storage element varies the data storage capability of the data storage element to be consistent with the data recording technique used therein. This capability enables the user to use a diversity of drive elements connected to the computer system without having to have a corresponding diversity in media element handling systems. This is accomplished by the use of a standardized data storage element having a form factor of substantially uniform exterior dimensions and adapted to receive any one of a plurality of different media types.

Universal Data Storage Element Architecture

Figure 1:
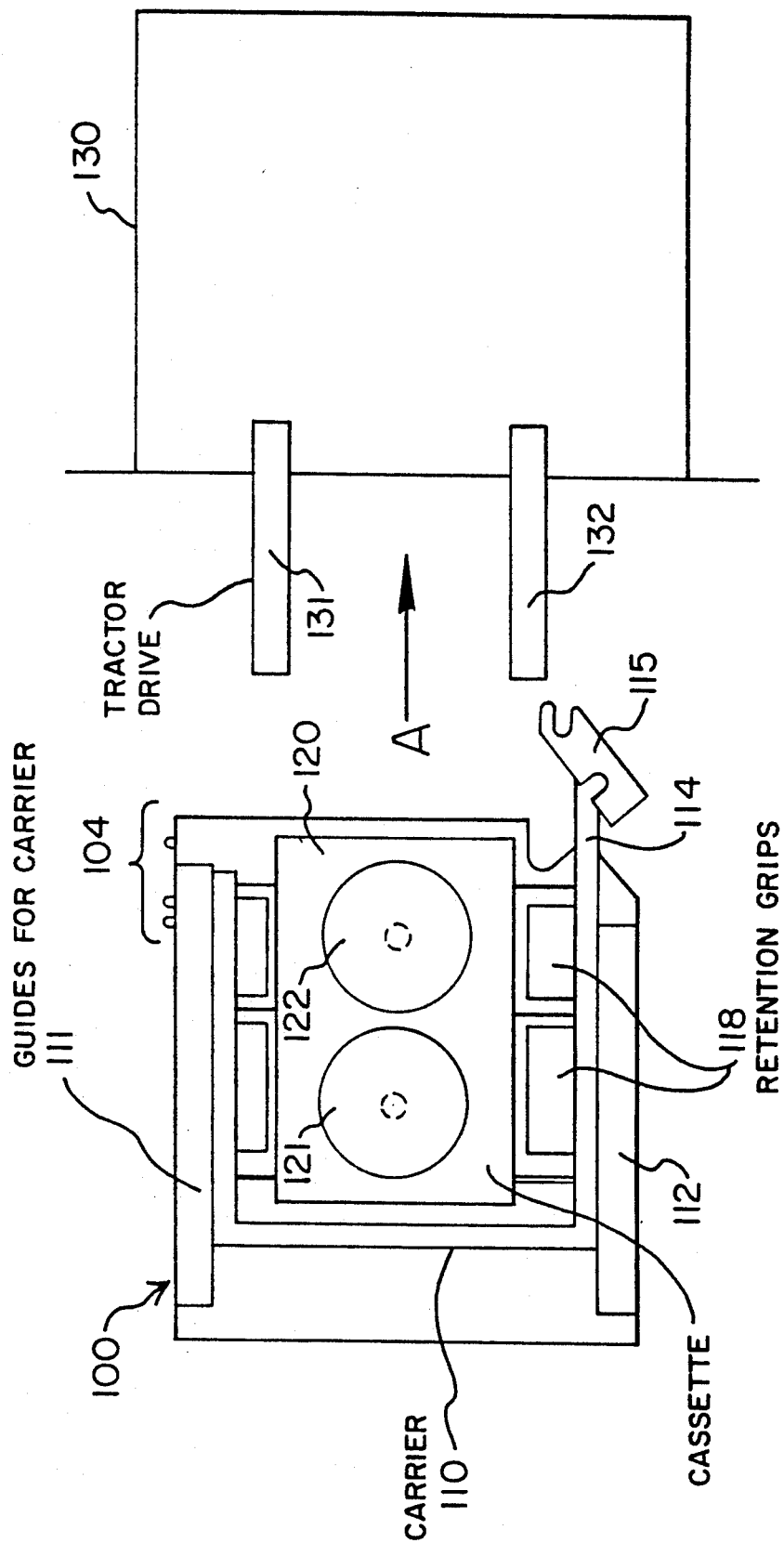
FIG. 1 illustrated the overall architecture of the universal data storage element.
Figure 2:
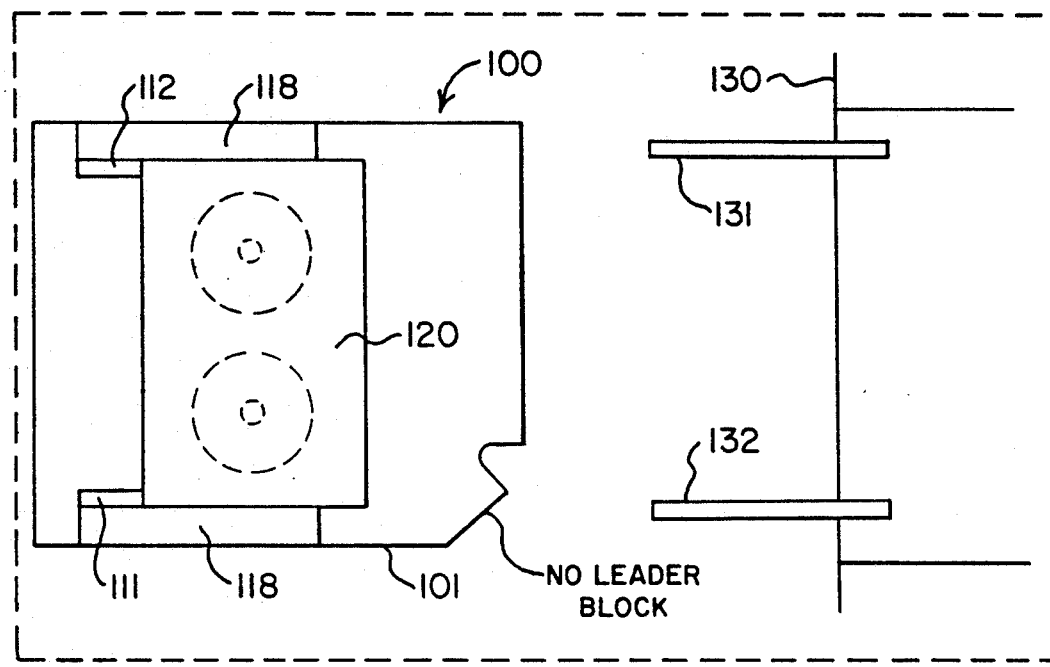
FIGS. 2-11 illustrate varying embodiments of the universal data storage element.
Figure 3:
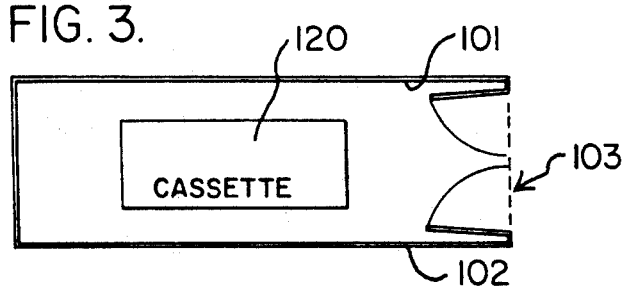
Figure 4:
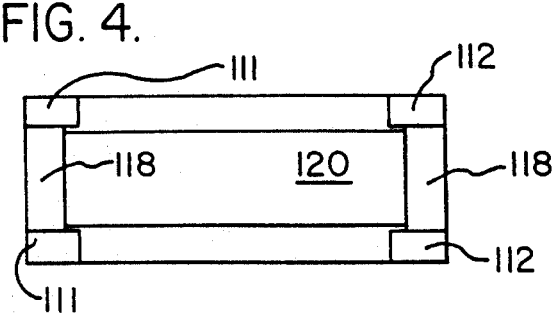
Figure 5:
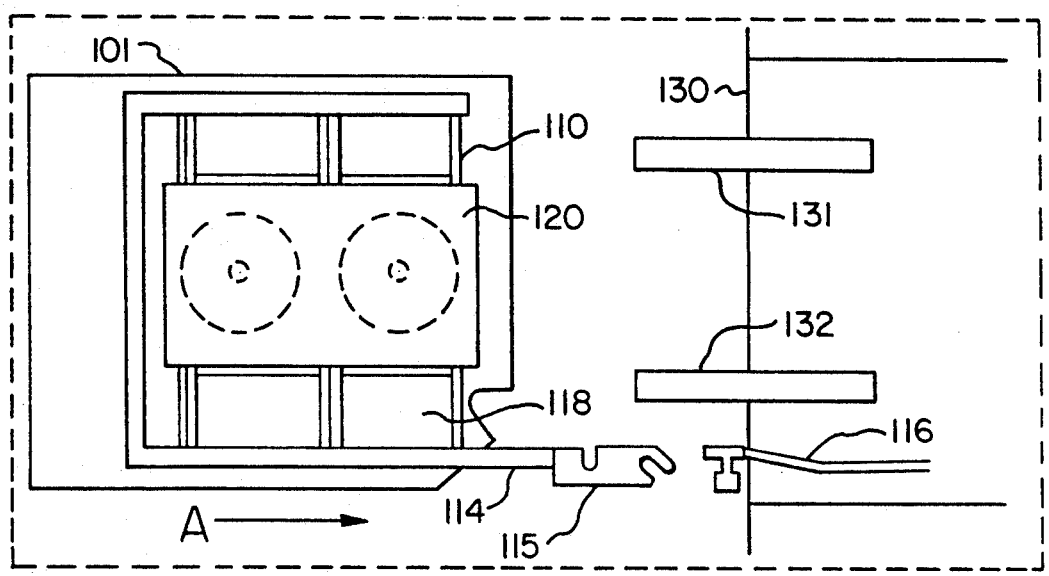

FIG. 1 illustrates the overall architecture of the universal data storage element 100. This data storage element 100 consists of an exterior housing 101 that substantially matches the industry standard 3480-type tape cartridge in exterior dimensions and configuration. Further details are shown in FIGS. 2-11.

Exterior housing 101 consists of a fixed housing body 102 to which is hingably affixed an access door 103 to provide access to the media located within exterior housing 101. Within exterior housing 101, the multimedia data storage element 100 contains a carrier 110 which is slidably connected to a pair of guide rails 111, 112 which are affixed to the interior walls of housing body 102 on opposite facing interior walls thereof. Carrier 110 is extensible from a loaded position, wherein it is located fully within exterior housing 101, to an extracted position, wherein all or part of carrier 110 is supported on guides 111, 112 in a position exterior to housing 101.

Media Retrieval

In order to effectuate the movement of carrier 110, there are a number of implementations that are possible. As illustrated in the figures, the standard leader block 115 of the 3480-type magnetic tape cartridge can be used as an element to accomplish the carrier withdrawal function. This leader block 115 is affixed either directly to carrier 110 or to an extension arm 114 that is itself affixed to carrier 110 to provide a point of contact for a media withdrawal element in the associated interface element 130. A mounting pin mechanism 116 in the interface element 130 receives leader block 115 and pulls carrier 110 with its associated media out of cartridge housing 101 by moving leader block 115 in the direction indicated by arrow A. Carrier 110 is of a configuration and dimension to support in a secure manner the media that is housed within exterior housing 101.

An alternative or supplementary media extraction mechanism is the use of a tractor mechanism 131, 132 located within interface element 130. The tractor arms 131, 132 lift the media (e.g. tape cassette 120) from carrier 110 and transport the media out of exterior housing 101. There are typically provided pressure fit retention elements, including flexible fingers, bands, or as illustrated in the FIGS. 1-5, retention pads 118 to secure tape cassette 120 in the media loaded position on carrier 110. The tractor arms 131, 132 present the retrieved media to the associated drive element for reading/writing data thereon.

Media Variations and Differentiation

At present, there is only one media type loaded into the commercially available 3480-type magnetic tape cartridge. The universal data storage element 100 uses various media types. There is the potential for damage to the media contained within the universal data storage element 100, or the associated interface element 130 or the drive if the media is incompatible with the associated drive. One method of avoiding this problem is to "encode" the universal data storage element 100 to identify the media stored therein. One possible encoding scheme is to modify leader block 115 so that only an appropriate match of the mounting pin 116 and leader block 115 would accomplish loading the media. If the leader block 115 gap is too large or too small or the leader block is omitted entirely, the mounting pin 116 can not grab leader block 115 and the loading process will abort.

Another media encoding scheme is the use of physical or optical features on the exterior of housing 101. An example of such features is the use of a pattern of ridges 104 (or indentations) located on one side of housing 101, which pattern corresponds to the media contained within universal data storage element 100. A corresponding coding detection apparatus in interface element 130 detects the presence and pattern of ridges 104 to determine whether the media contained in this universal data storage element 100 is compatible with the associated drive element. The presence of an incompatible media would abort the loading process prior to the interface element 130 attempting to access the media contained within housing 101.

The ridge detection itself can be accomplished by the use of a mechanically oriented sensor (ex.—roller equipped microswitch) or an optical sensor which detects the pattern of ridges 104 or similarly patterned features imprinted on housing 101 for optical reading. A typical pattern can be a bar-code or machine-readable alphanumeric character.

Various embodiments are illustrated in FIGS. 1-5 to show the use of a tape cassette 120 which consists of its own exterior housing within which is placed two rotatably mounted coplanar reels 121, 122 for transporting magnetic tape therebetween. This well known tape cassette architecture represents presently available magnetic media, whether linearly or helically recorded, which is incompatible with the form factor of the tape cartridges processed by 3480-type magnetic tape storage and retrieval systems. The concept illustrated by universal data storage element 100 is extensible to numerous recording technologies such that magnetic tape of various exterior form factors and tape dimensions can be incorporated in universal data storage element 100. In addition disks whether hard or floppy of magnetic or optical recording technology can be used therein.

Figure 6:
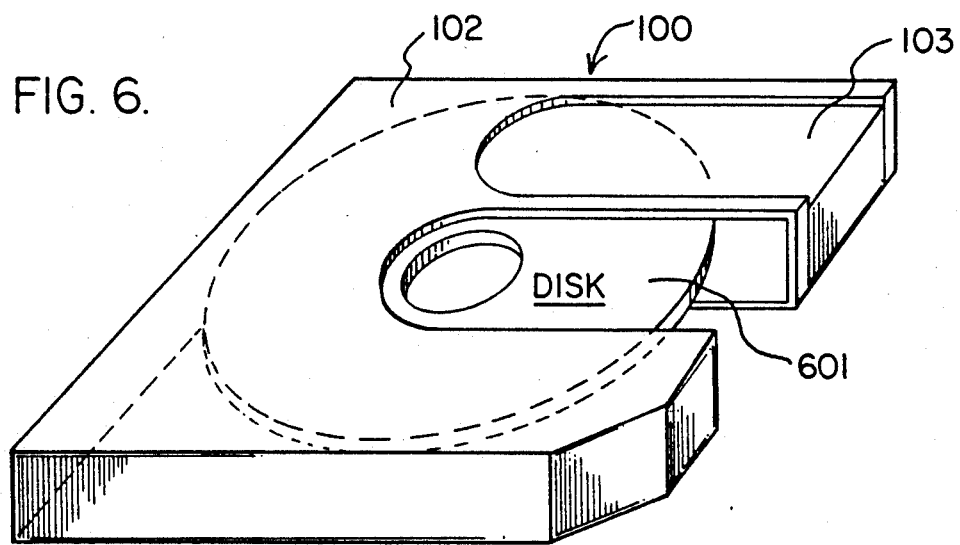
Figure 7:
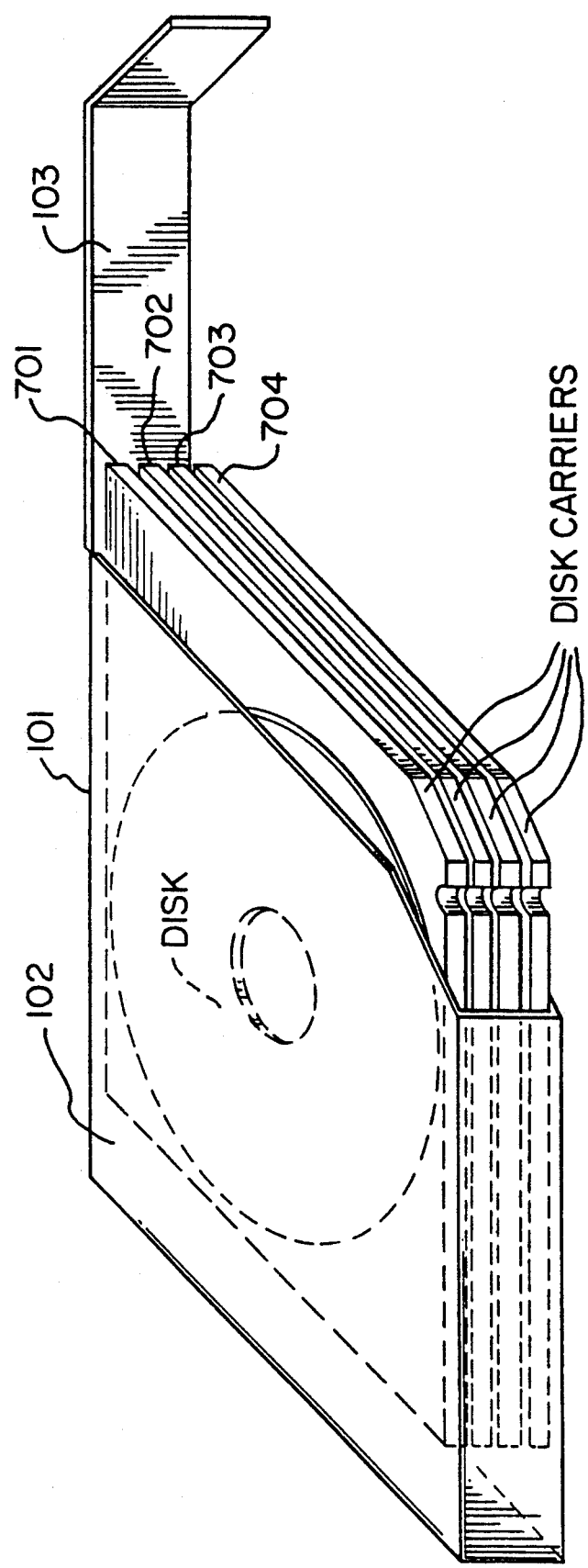
Figure 8:
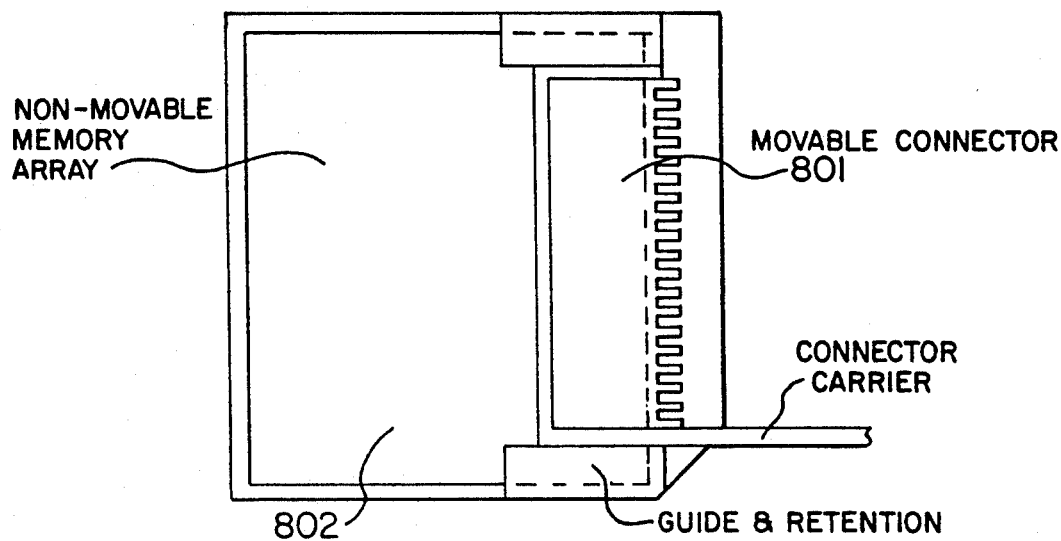
Figure 9:
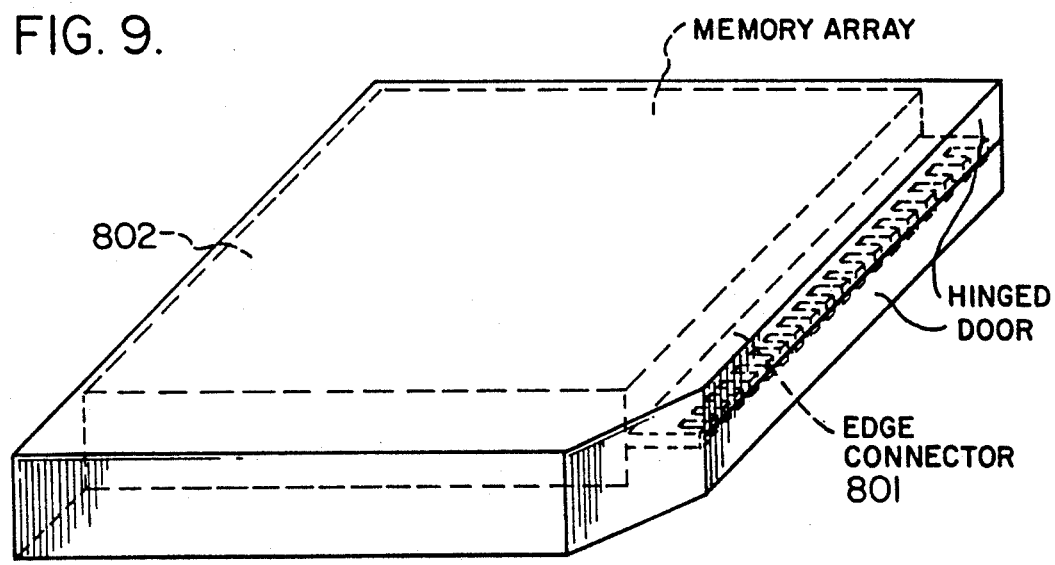
Figure 11:
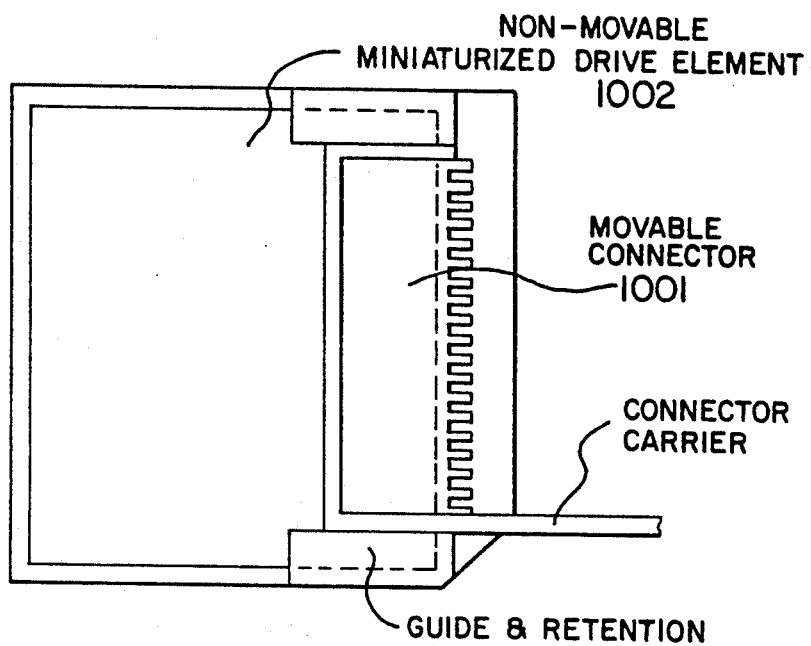
Figure 10:
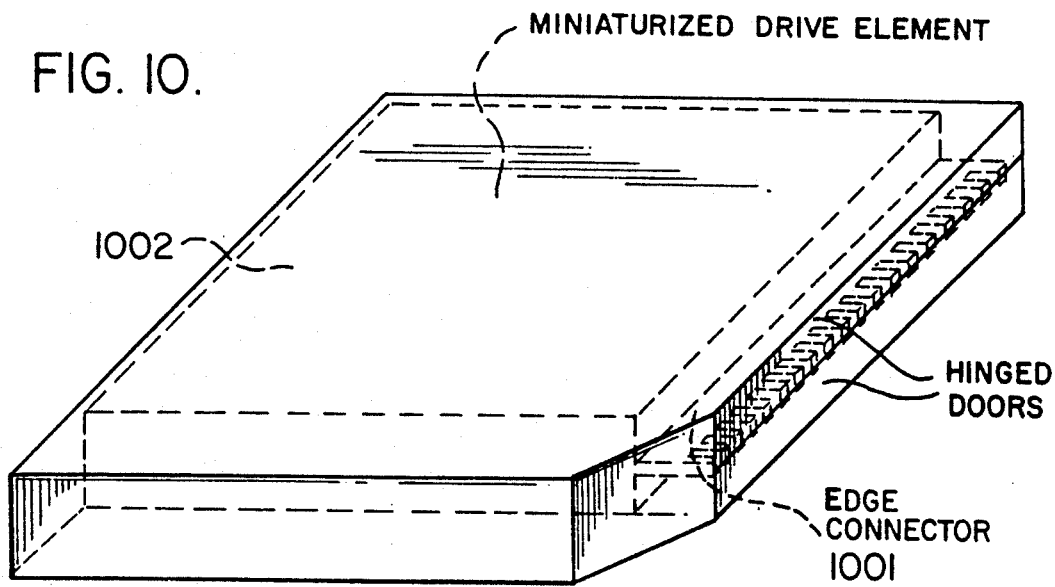

The media contained within universal data storage element 100 as a disk shaped recording media is illustrated in FIGS. 6 and 7. The disk shaped recording media can be an independent platter 601 which is retrieved from within the universal data storage element 100 by use of the carrier 110 as disclosed above. The platter 601 is then placed onto a drive mechanism in the associated drive element. The disk platter 601 can be of varying implementations, either a floppy or hard disk for magnetic or optical recording of data thereon. Furthermore, carrier 110 can be configured to provide the associated interface element 130 with access to a plurality of media elements stored within universal data storage element 100. A plurality of disks 701-704 typically can be stored in exterior housing 101 and all simultaneously retrieved by the operation of carrier 110 or individually by the use of a plurality of carriers 110 or an appropriate segmented carrier 110 mechanism. The disk format media stored in data storage element 100 are rotating media elements. The disk format media can therefore be removable from carrier 110 to be placed in a corresponding disk drive or rotatably affixed to carrier 110 (FIG. 7). In this latter configuration, door 103 is opened by the associated interface element and carrier 110 is extracted from housing 101 a sufficient distance to enable a drive mechanism to rotate the disk and provide recording elements with access to the data storage surface thereon.

Other technologies such as miniaturized drive elements or solid state memory can be used within this universal data storage element (FIGS. 8-11). A connector 801 is affixed to the interior of the housing 101 at the end closest to the opening in universal data storage element 100. The connector 801 can be an integral part of the drive element 1002 or solid state memory module 802 or connected thereto and removable therefrom. In either case, the access is accomplished by the interface element 130, which directly mates the drive element or memory module with controlling elements or partially or fully extracts the connector 801 from exterior housing 101 to be plugged into a mating connector piece in associated drive or control elements. In this embodiment, the miniaturized drive element 1002 or solid state memory module 802 are fixed within the housing and its associated connector 1001/801 is the media element that is accessed by interface element 130. The connector 1001/801 can be fixed (ex—edge board connecter) and directly plugged into a mating connection in the drive element or movable for partial/full extraction from the housing.

Summary

The universal data storage element of the present invention provides a uniform media form factor of well defined exterior dimensions for a multitude of data storage media. A computer system can be equipped with an automated library system or a uniform storage and retrieval system of a manual nature to handle diverse types of media. The use of a consistent exterior housing form factor for the various types of media therefore simplifies the mechanical data storage element storage and retrieval operation. The use of the universal data storage element enables the user to store data on media that is appropriate for the nature of the data as well as provide a variable selection of drive elements for the computer system without the logistical complexities of diverse and incompatible media types. The universal data storage element supports magnetic tape, magnetic disk, optical disk, solid state memory in varying specific forms and data recording formats.

While a specific embodiment of this invention has been disclosed, it is expected that those skilled in the art can and will design alternate embodiments of this invention that fall within the scope of the appended claims.

We claim:

1. A data storage element capable of housing a plurality of types of data storage media, each said type of data storage media being of predefined form factor and requiring a corresponding media drive unit that accepts only the predefined form factor, said data storage element being inserted into an interface unit that extracts the data storage media from said data storage element for a media drive unit connected to the interface unit for reading/writing data on said data storage media, to enable the uniform handling in a data storage and retrieval system of a plurality of different types of data storage media, said data storage element comprising:

exterior housing means, having predetermined exterior dimensions, to present uniform physical data storage element exterior dimensions to a data storage and retrieval system, and having an opening in one end thereof;

data storage media, stored in said exterior housing, being one of said plurality of types of data storage media and having a predefined form factor, said form factor requiring the use of a media drive unit that is not necessarily directly compatible with said data storage element;

carrier means, attached to the interior of said exterior housing means, for transporting said data storage media having predetermined form factor, in said exterior housing means to at least partially extract said data storage media from said exterior housing means through said opening when said data storage element is inserted into an interface unit that receives said data storage element and presents said one predetermined form factor data storage media to said media drive unit capable of accepting said predetermined form factor data storage media.

2. The data storage element of claim 1 wherein said carrier means includes:

means, having first and second sides, for supporting said data storage media;

a pair of guide means, each located on one of said sides of said supporting means and affixed to said interior of said exterior housing means for slidably guiding said supporting means between a first position, wherein said supporting means is located completely within said exterior housing means, and a second position, wherein said supporting means at least partially exits said exterior housing means through said opening.

3. The data storage element of claim 2 wherein said carrier means further includes:
   means, attached to said supporting means, for enabling the mechanical extraction of said supporting means from said exterior housing means through said opening.

4. The data storage element of claim 3 wherein said enabling means comprises:
   retrieval arm means having first and second ends, wherein said first end is connected to said supporting means and said second end is positioned proximate to said opening when said supporting means is located in said first position.

5. The data storage element of claim 4 wherein said enabling means further includes:
   means, attached to said second end of said retrieval arm means, for providing a point of connection for said mechanical extraction of said supporting means.

6. The data storage element of claim 2 wherein said data storage media comprises a magnetic tape cassette, said carrier means further includes:
   means for releasably retaining said magnetic tape cassette in a predetermined position on said supporting means.

7. The data storage element of claim 2 wherein said data storage media comprises a magnetic disk, said carrier means further includes:
   means for releasably retaining said magnetic disk in a predetermined position on said supporting means.

8. The data storage element of claim 2 wherein said data storage media comprises an optical disk, said carrier means further includes:
   means for releasably retaining said optical disk in a predetermined position on said supporting means.

9. The data storage element of claim 2 wherein said data storage media comprises a magnetic tape cartridge, said carrier means further includes:
   means for releasably retaining said magnetic tape cartridge in a predetermined position on said supporting means.

10. The data storage element of claim 2 wherein said data storage media comprises a solid state memory having a connector attached thereto, said carrier means further includes:
    means for affixing said connector to said carrier means.

11. The data storage element of claim 10 wherein said connector is partially extracted from said exterior housing means.

12. The data storage element of claim 2 wherein said data storage media comprises a miniaturized drive element having a connector attached thereto, said carrier means further includes:
    means for affixing said connector to said carrier means.

13. A data storage element capable of housing a plurality of types of data storage media, each said type of data storage media being of predestined form factor and requiring a corresponding media drive unit that accepts only the predestined form factor, said data storage element being inserted into an interface unit that extracts the data storage media from said data storage element for a media drive unit connected to the interface unit for reading/writing data on said data storage media, to enable the uniform handling of data storage media in a data storage and retrieval system, said data storage element comprising:
    exterior housing means, having predetermined exterior dimensions to present uniform physical data storage element exterior dimensions to said data storage and retrieval system, and having an opening in one end thereof;
    data storage media, stored in said exterior housing, being one of said plurality of types of data storage media and having a predestined form factor, said form factor requiring the use of a media drive unit that is not necessarily directly compatible with said data storage element;
    carrier means, attached to the interior of said exterior housing means, for transporting said data storage media having predetermined form factor in said exterior housing means between a first position, wherein said data storage media means is located completely within said exterior housing means, and a second position, wherein said data storage media means at least partially exits said exterior housing means through said opening including:
        means, having first and second sides, for supporting said data storage media,
        a pair of guide means, each located on one of said sides of said supporting means and affixed to the interior of said exterior housing means, for slidably guiding said supporting means between said first position and said second position,
        retrieval arm means having first and second ends, wherein said first end is connected to said supporting means and said second end is positioned proximate to said opening when said supporting means is located in said first position,
        means, attached to said second end of said retrieval arm means, for providing a point of connection for said mechanical extraction of said supporting means.

* * * * *